United States Patent [19]
Kaebitzsch et al.

[11] 4,088,067
[45] May 9, 1978

[54] COOKING APPLIANCE

[75] Inventors: Johannes W. Kaebitzsch, Crystal Lake; John L. Tuegel, Island Lake, both of Ill.

[73] Assignee: McGraw-Edison Company, Elgin, Ill.

[21] Appl. No.: 695,093

[22] Filed: Jun. 11, 1976

[51] Int. Cl.$^2$ .............................................. A47J 37/06
[52] U.S. Cl. ...................................................... 99/379
[58] Field of Search ................. 99/372, 376, 377, 379, 99/380, 422, 424, 426, 439, 442, 340, 332, 335, 375; 100/93 R, 93 P, 257, 258 R, 266

[56] References Cited

U.S. PATENT DOCUMENTS

| 1,697,754 | 1/1929 | Chandler | 99/379 |
| 1,738,972 | 12/1929 | Strader | 99/379 |
| 2,211,900 | 8/1940 | Leavitt | 99/372 |
| 2,607,287 | 8/1952 | Price | 99/372 |
| 2,632,379 | 3/1953 | Kudo | 99/375 |
| 2,865,280 | 12/1958 | Lamatina | 99/332 |

FOREIGN PATENT DOCUMENTS 215,002 11/1956 Australia .................. 99/375

*Primary Examiner*—Harvey C. Hornsby
*Assistant Examiner*—Timothy F. Simone
*Attorney, Agent, or Firm*—Charles F. Lind; Ronald J. LaPorte; Jon Carl Gealow

[57] ABSTRACT

A sandwich grill or similar cooking appliance is disclosed. The sandwich grill is adapted to heat both upper and lower surfaces of a sandwich or other article to be cooked, under controlled conditions. The appliance includes a main housing unit with a lower platen supported thereon, an upper platen, and a heat source for both platens. The upper platen is supported by a mounting arm or the like, for movement between a raised position and a range of lowered positions. In the raised position, sandwiches can be placed on or removed from the grill. The upper platen is mounted so that, in the lowered position thereof, the platen may pivot freely so that its lower surface will engage the upper surface of the sandwich. This permits the upper platen to lie parallel to the lower platen or to the upper surface of the sandwich. The grill includes a counterbalancing spring which acts on the support arm and the upper platen so as to reduce the downward force exerted by the upper platen on the article when the arm is lowered. The sandwich grill further includes an adjusting assembly associated with the support arm and adapted to engage a part of the appliance which is fixed with respect to the housing so as to determine which of a number of lowered positions the upper platen will occupy when it is lowered. The adjustment also prevents application of undue downward force on a sandwich when the grill is initially closed by lowering the upper platen.

2 Claims, 3 Drawing Figures

U.S.Patent    May 9, 1978    4,088,067
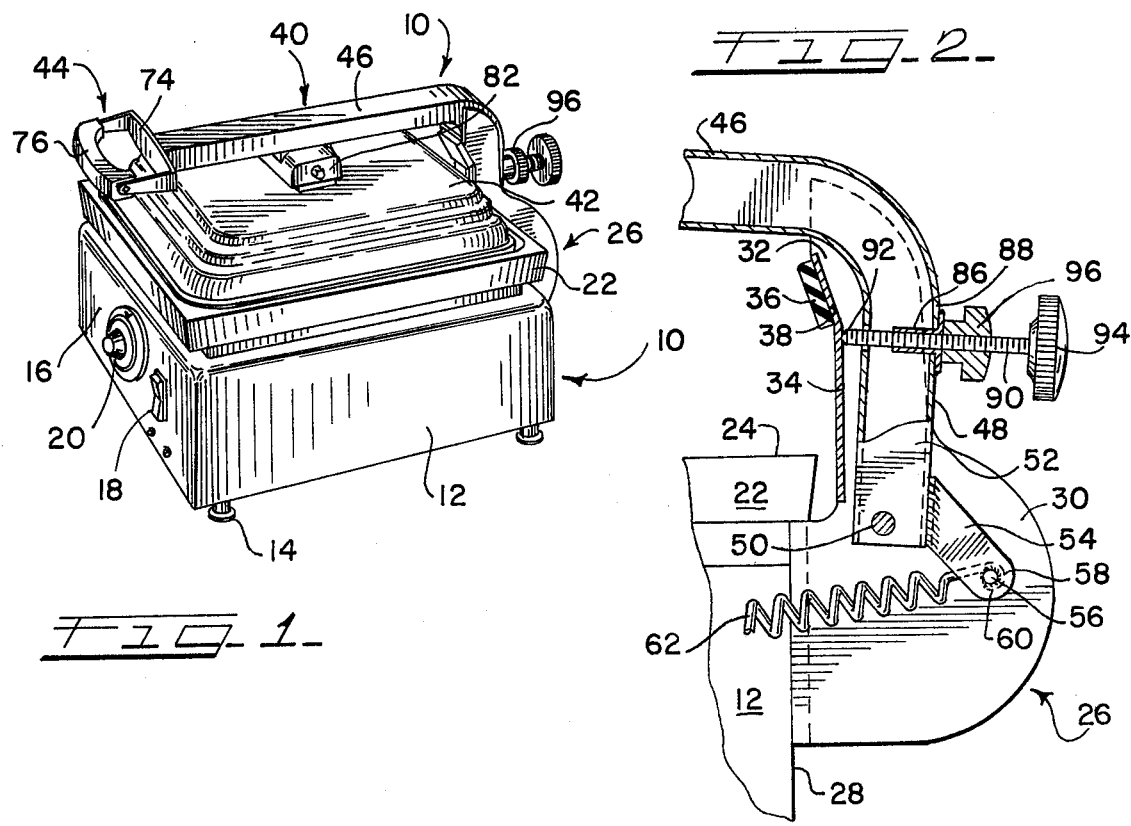
FIG. 1.
FIG. 2.
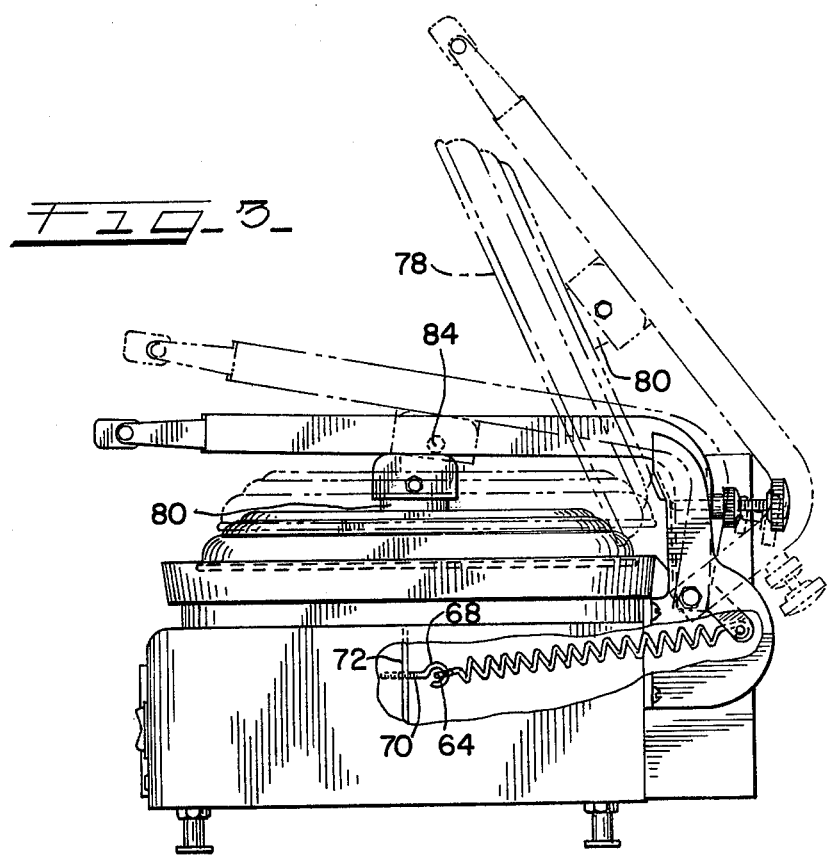
FIG. 3.

COOKING APPLIANCE

BACKGROUND OF THE INVENTION

The present invention relates generally to so-called sandwich grills, and more particularly to improved sandwich grills having novel arrangements of elements, greater versatility, which are capable of improved and simplified operation, and which incorporate other advantages in use.

Sandwich grills in general are well known, and are typically comprised of upper and lower heated platens, together with additional structure arranged so that the upper platen is movable between open and closed positions to facilitate inserting sandwiches or other articles into the appliance for cooking, and removing them when they have been heated or cooked to a desired degree. While many such devices are satisfactory in use, there still remains a need for a sandwich grill type appliance which has additional advantages, and which will achieve improved operating characteristics without substantially increasing the cost or complexity thereof.

In many prior art sandwich grills, careful attention from the operator has been required in order to insure that the sandwich was being grilled or toasted within a reasonably short time without being burned. Other sandwich grills are not adapted to accommodate satisfactorily sandwiches or other articles to be cooked where the articles are of different vertical heights or thicknesses. In some prior art sandwich grills, means were not provided for insuring that the sandwich grill cover or upper platen remained parallel to the lower platen portion when unusually thick or thin sandwiches or other food products were sought to be cooked therein.

In still other grills or toasters of the type in question, the lower platen and the upper platen were arranged such that too little or too much pressure could be applied manually to the food product, and in many of such constructions, satisfactory means were not provided for permitting the top cover to achieve a desired height above the lower platen portion, particularly a height which could be repeatedly attained and yet simply adjusted.

Still further, no prior art sandwich grill has provided a combination of adjustability, ease of operation, cover suspension facilitating parallel alignment between upper and lower cooking sufaces, and location of the operating and adjusting elements in the most desirable way from the standpoint of ease of operation and maintenance.

Certain other prior art sandwich grills were not adapted to be easily cleaned or able to be simply adjusted when the occasion demanded. In still other prior art grills the movement-limiting adjustment interfered with loading and unloading of the machine.

In other prior art appliances, the adjustment means did not allow for a relatively broad range of adjustment, while permitting the adjustment to be made as precisely as the user desires.

Detailed descriptions of sandwich grills having one or more of the features referred to above may be found in the following U.S. Pat. Nos.:

Chandler, 1,609,694 (Re. 17,114);
Lemaster, 1,661,294;
Chandler, 1,697,754;
Jaeger, 1,706,611;
Cannon, 1,708,258;
Strader, 1,738,972;
Leavitt, 2,211,900;
McCullough 2,264,094;
Price, 2,607,287;
Kudo, 2,632,379;
Majerus, 3,068,778;
Morley, 3,776,124; and
Lamatina, 2,865,280.

In view of the foregoing shortcomings of certain prior art sandwich grills, it is an object of the present invention to provide an improved sandwich grill for cooking or toasting food products.

Another object is to provide a grill in which the lowered position of the upper platen may be adjusted without substantially affecting either the initial or the continuing downward forces applied to the article to be cooked.

Still another object is to provide a sandwich grill in which the minimum height at which the upper platen may be positioned can be adjusted, with the sandwich or other article to be cooked being ideally just slightly thicker than the space provided between the platens.

A further object is to provide a grill in which the operating handle may be initially manipulated to move the upper platen and its supporting structure downwardly, whereby the upper surface of the article may be contacted only lightly, or in which the article may be compressed to a limited degree; and also in which the downward movement of the upper platen is positively limited so that the operator cannot undesirably compress the article to render it unpalatable or unattractive.

Yet another object is to provide a sandwich grill in which the user or operator of the appliance may rapidly move the cover to a fully lowered position without fear of damaging the cooked article.

Still a further object is to provide a sandwich grill which includes a cover leveling feature and a counterbalance spring to limit forces acting on the article after the cover is lowered.

Another object is to provide a sandwich grill having means disposed at the rear of the unit for adjusting the lowered position of the upper platen unit in use, and in which the cover mounting arrangement permits the cover to remain parallel to the lower cooking surface, or to align itself parallel to the upper surface of the food product, as may be desired.

The foregoing objects and advantages of the invention are achieved in practice by providing a grill assembly for sandwiches and other like articles to be cooked which includes upper and lower heated platens, means supporting the upper platen and mounting it for movement between a raised position and a range of selected lowered positions, means attaching the upper platen to the supporting means for free but limited pivotal movement so as to permit said upper platen to lie parallel to said lower platen throughout said range of lowered positions, means counterbalancing at least a portion of the weight of said upper platen and said support means, and adjustment means for determining which of said lowered positions said upper platen will occupy in use.

The exact manner in which the foregoing and other objects and advantages are achieved in practice will become more clearly apparent when reference is made to the following detailed description of the preferred embodiments of the invention set forth by way of example, and shown in the accompanying drawings, wherein like reference numbers indicate corresponding parts throughout.

BRIEF DESCRIPTION OF THE DRAWINGS

FIG. 1 is a perspective view of a sandwich grill made according to the invention, showing the grill in a closed position of use, with the upper platen closely overlying the lower platen and with the cover supporting arm and handle in a generally horizontal position;

FIG. 2 is an enlarged vertical sectional view, with portions broken away, showing a part of the upper platen supporting assembly, the counterbalance spring and the means for adjusting the lowered position of the upper platen; and FIG. 3 is a side elevational view of the sandwich grill of FIG. 1, with portions broken away showing the upper platen in a closed position in solid lines, and in an open position and another closed position in phantom lines.

DESCRIPTION OF THE PREFERRED EMBODIMENTS OF THE INVENTION

While it will be understood that the invention may be embodied in appliances of different types, a description thereof will be made with respect to a sandwich grill of the type used for heating and toasting food products placed between a pair of opposed electrically heated platens or grilling surfaces.

Referring now to the drawings in greater detail, FIG. 1 shows the invention to be typically embodied in a sandwich grill generally designated 10 and shown to include a main cabinet or housing 12 supported on feet 14. The grill cabinet 12 includes a front cabinet surface 16 having means in the form of a rocker switch 18 for turning the unit on and off, and a dial 20 for controlling the temperature of the cooking surfaces.

Atop the cabinet 12 is a lower platen 22 having an upwardly directed, generally flat metal heated cooking surface 24.

A bracket assembly generally designated 26 is affixed to the rear wall portion 28 of the housing 12, with the bracket 26 including a pair of rearwardly extending semi-circular flanges 30, and a neck portion defined by two upwardly extending flanges 32 joined to each other along the front edges thereof by a transversely extending neck wall 34. A pad 36 made from a rubber or like cushioning material is affixed to the inclined, uppermost portion 38 of the neck wall 34. Means in the form of an arm 40 for supporting an upper platen 42 are shown to be provided and to include a front handle assembly 44, a principal cover support portion 46 and an angularly disposed platen support arm mounting extension 48.

A pivot pin 50 extends through the side walls 52 of the lower end of the mounting extension 48, as well as through suitably sized openings in the flanges 30, thus attaching the arm 40 for pivotal movement with respect to the cabinet 12.

Balance spring ears 54 extend outwardly and downwardly from the lower end of the mounting extension 48. A spring-receiving pin 56 extends between openings 58 in the ears 54. The pin 56 is adapted to receive a hook 60 at the end of a counterbalance spring 62, the other end 64 of which is secured within an eye 68 of a bolt 70 secured to a spring bracket 72 disposed within the housing 12 of the grill unit 10. The eye bolt 70 may be adjusted for increasing or decreasing the tension on the spring 62 which serves as the counterbalancing force.

Referring again to FIG. 1, it will be seen that the front handle assembly 44 includes a generally U-shaped bracket 74 affixed to the forward end of the cover support portion 46. An operating handle 76, which is made from a thermosetting plastic or other heat insulating material, extends between and is joined to the end portions of the bracket 74.

FIGS. 1 and 3 show that the upper platen assembly 42 includes a downwardly directed, generally flat, heated surface portion 78. The upper platen assembly 42 also includes an upwardly extending holder 80, which, in use, is surrounded by a downwardly extending cup unit 82 which is in turn affixed to the center portion of the upper platen support 46. A transversely extending pivot pin 84 fastens the cup unit 82 to the holder 80, permitting the upper platen 42 to swing freely, within limits, through a range of positions. This enables the lower surface portion 78 of the upper platen 42 to lie parallel to the lower platen 22, or to the upper surface of a sandwich received thereon, whichever is desired. In the raised position of the cover support 46 the rear of the upper platen assembly 42 engages the rubber pad 36.

Referring again to FIG. 2, the assembly for adjusting the lower position of the upper platen support is shown. This assembly includes a threaded bushing 86 snugly received in the rear wall 88 of the mounting extension 48. An adjusting screw 90 extends through the bushing 86, with the inner end portion 92 of the screw engaging the transverse neck wall 34 of the bracket 32. A finger knob 94 is affixed to the end of the adjusting screw 90, and a lock nut 96 is threaded over the intermediate portion of the adjusting screw 90 to prevent the stop or adjustment mechanism from loosening inadvertently.

Heating of the platens is accomplished by conventional electric resistance heating, and the arrangement and operation of electric platen heaters of this type well known to those skilled in the art, a detailed description thereof will not be set forth herein. Likewise, the controls associated therewith such as the thermostat control operated by the knob 20, are conventional in nature, and not being novel per se, will not be described in detail.

Referring now to the operation of the sandwich grill 10, it will be assumed that the unit has been plugged in, energized by activation of the switch 18 and preheated to a suitable temperature.

Next, a sandwich or other article to be cooked is placed in the grill atop the lower platen 22. The handle 76 is grasped by the operator, and the arm 40 is lowered gently until contact is made with the upper surface of the article to be cooked or toasted. In the event that further downward manually applied forces are able to distort or squeeze the sandwich unduly, the lock nut 96 is loosened and the fingers are used to manipulate the adjusting screw 90, raising or lowering it until the article to be cooked has the upper surface thereof lightly engaged by the lower surface of the upper platen 42. Then, the knob or nut 96 is locked in place, securing the adjusting screw against further movement.

After this initial adjustment has been made, sandwiches or other articles of similar thickness can be toasted or cooked easily by the operator, who can firmly lower the upper platen until a definite, sensible stop point, easily identified by touch, is reached. Thereafter, the residual effective weight of the upper platen 42 and that part of the arm 40 which supports it can be offset to the desired degree by the action of the counterbalance spring. The forces provided by the spring can also be adjusted as pointed out above. In this manner, the effective weight or downwardly directed force on the article to be cooked will be a function only of the weight of the platen, and the article will not be compressed unduly by rapid or careless downward movement of the upper platen. In prior art sandwich grills, the operator was often hurried by the press of activities in the restaurant in which the grill was used, and either through carelessness or haste, tended to move the upper platen downwardly too rapidly, squeezing the sandwich to excess. This in turn undesirably rendered the appearance of the sandwich unpalatable.

In the use of the present invention, the arm 40 can be lowered rapidly without fear of damaging the article to be cooked, and yet the essential cooking or toasting pressure on the article can be kept constant. As a result, sandwiches or other articles can be prepared more rapidly without sacrifice of quality.

It will thus be seen that the present invention provides a novel sandwich grill having a number of advantages and characteristics including those pointed out above and others which are inherent in the invention. A preferred embodiment of the invention having been described by way of illustration, it is anticipated that changes and modifications of the described sandwich grill will occur to those skilled in the art and that such changes and modifications may be made without departing from the spirit of the invention or the scope of the appended claims.

We claim:

1. A sandwich grill comprising the combination of a housing having a bracket at the rear side thereof, a lower platen supported on the housing forwardly of the bracket, an L-shaped arm, a pivotal connection between the bracket and the arm near one end of the arm to allow the opposite end of the arm to extend forwardly over the lower platen, a handle on the opposite end of the arm, an upper platen, means pivotally supporting the upper platen to the arm intermediate the handle and the pivotal connection, whereby pivotal movement of the arm moves the upper platen between an open position well spaced relative to the lower platen and a closed position closely adjacent and opposing the lower platen, adjustable counterbalance means extended between the housing and the one end of the arm spaced from the pivotal connection for resiliently biasing the upper platen toward the open position, means to heat the upper and lower platens, an upwardly extending stop rigid with said bracket and spaced above and forwardly of the pivotal connection and rearwardly of the lower platen, adjustable projection means secured to the arm and disposed to abut the stop on a rearward surface thereof to mechanically limit the proximity in the closed position of the upper platen relative to the lower platen, and means exposed rearwardly of the above the pivotal connection in the closed positions of the upper platen to adjust and lock the position of the projection means relative to the arm operable to adjust as desired the closed spacing of the upper platen from the lower platen.

2. A sandwich grill according to claim 1, further including the stop having a forward surface against which the upper platen abuts in the open position thereof to mechanically position the upper platen in said open position.

* * * * *

UNITED STATES PATENT AND TRADEMARK OFFICE
CERTIFICATE OF CORRECTION

PATENT NO. : 4,088,067

DATED : May 9, 1978

INVENTOR(S) : Johannes W. Kaebitzsch & John L. Tuegel

It is certified that error appears in the above-identified patent and that said Letters Patent are hereby corrected as shown below:

Claim 1, column 6, line 20, delete "the" and substitute -and-

Signed and Sealed this

Third Day of October 1978

[SEAL]

Attest:

RUTH C. MASON
Attesting Officer

DONALD W. BANNER
Commissioner of Patents and Trademarks